United States Patent
Kawasaki et al.

(10) Patent No.: US 9,966,601 B2
(45) Date of Patent: May 8, 2018

(54) POSITIVE ELECTRODE ACTIVE MATERIAL FOR NONAQUEOUS ELECTROLYTE SECONDARY BATTERY

(71) Applicant: NICHIA CORPORATION, Anan-shi, Tokushima (JP)

(72) Inventors: Tomooki Kawasaki, Naruto (JP); Kenichi Kobayashi, Tokushima (JP)

(73) Assignee: NICHIA CORPORATION, Anan-shi (JP)

(*) Notice: Subject to any disclaimer, the term of this patent is extended or adjusted under 35 U.S.C. 154(b) by 32 days.

(21) Appl. No.: 15/075,937

(22) Filed: Mar. 21, 2016

(65) Prior Publication Data

US 2016/0285092 A1  Sep. 29, 2016

(30) Foreign Application Priority Data

Mar. 24, 2015 (JP) ................. 2015-061712
Dec. 17, 2015 (JP) ................. 2015-246565

(51) Int. Cl.
| | |
|---|---|
| *H01B 1/08* | (2006.01) |
| *H01M 4/505* | (2010.01) |
| *C01G 53/00* | (2006.01) |
| *H01M 10/052* | (2010.01) |
| *H01M 4/525* | (2010.01) |

(52) U.S. Cl.
CPC ............ *H01M 4/505* (2013.01); *C01G 53/54* (2013.01); *H01B 1/08* (2013.01); *C01P 2002/52* (2013.01); *C01P 2006/40* (2013.01); *H01M 4/525* (2013.01); *H01M 10/052* (2013.01)

(58) Field of Classification Search
CPC .... H01M 4/505; H01M 4/525; H01M 10/052; C01G 53/54; C01P 2002/52; C01P 2006/40; H01B 1/08
See application file for complete search history.

(56) References Cited

U.S. PATENT DOCUMENTS

| | | | |
|---|---|---|---|
| 6,361,756 B1* | 3/2002 | Gao | C01G 45/1228 423/594.15 |
| 2013/0122373 A1* | 5/2013 | Tamura | H01M 4/485 429/221 |
| 2013/0168601 A1* | 7/2013 | Noguchi | H01M 4/525 252/182.1 |
| 2016/0240856 A1* | 8/2016 | Paulsen | H01M 4/5825 |

FOREIGN PATENT DOCUMENTS

| | | |
|---|---|---|
| JP | 2003-197194 A | 7/2003 |
| JP | 2012-033279 A | 2/2012 |
| WO | 2012-077472 A1 | 6/2012 |

* cited by examiner

*Primary Examiner* — Mark Kopec
*Assistant Examiner* — Jaison P Thomas
(74) *Attorney, Agent, or Firm* — Hunton Andrews Kurth LLP

(57) ABSTRACT

The present disclosure provides a positive electrode active material for nonaqueous electrolyte secondary batteries including: a lithium transition metal composite oxide represented by general formula: $Li_a(Ni_{1-x}Cr_x)_\alpha(Mn_{1-y}Ti_y)_{2-\alpha-\beta-\gamma-\delta}Mg_\beta Al_\gamma M_\delta O_4$ in which $1.00 \le a \le 1.30$, $0.020 \le x \le 0.200$, $0.006 \le y \le 0.070$, $0.450 \le \alpha \le 0.550$, $0 \le \beta \le 0.015$, $0 \le \gamma \le 0.035$, and $0 \le \delta \le 0.010$, and M represents at least one element selected from the group consisting of Na, K, Ca, Sr, Ba, Ga, Co, Zn, Si, Ge, Zr, Hf, Sn, Ta, Nb, P, Bi, Mo, and W.

20 Claims, 1 Drawing Sheet

POSITIVE ELECTRODE ACTIVE MATERIAL FOR NONAQUEOUS ELECTROLYTE SECONDARY BATTERY

CROSS-REFERENCE TO RELATED APPLICATION

This application claims priority to Japanese Patent Application No. 2015-061712, filed on Mar. 24, 2015, and No. 2015-246565 filed on Dec. 17, 2015. The entire disclosure of Japanese Patent Application No. 2015-061712 and No. 2015-246565 are hereby incorporated herein by reference.

BACKGROUND OF THE INVENTION

Field of the Invention

The present invention relates to a positive electrode active material for nonaqueous electrolyte secondary batteries, such as lithium ion secondary batteries.

Description of the Related Art

In recent years, miniaturization and high functionalization of mobile devices such as mobile phones and note-type PCs have been in progress. For the driving power source of those mobile devices, nonaqueous electrolyte secondary batteries, such as lithium ion secondary batteries, have been used. The nonaqueous electrolyte secondary batteries have high operating voltage and thus have the advantage of higher energy density than those of other secondary batteries. Due to this advantage, the nonaqueous electrolyte secondary batteries have started being applied in larger machinery such as electric vehicles.

As a major example of positive electrode active materials for nonaqueous electrolyte secondary batteries, lithium cobalt oxide ($LiCoO_2$) has been put into practical use. The nonaqueous electrolyte secondary batteries which use lithium transition metal composite oxides having a layer structure, such as lithium cobalt oxide, as the positive electrode active materials have average operating voltage of approximately 3.5 V. Meanwhile, with the use of a lithium transition metal composite oxide having a spinel structure, such as lithium manganate ($LiMn_2O_4$), as a positive electrode active material, a nonaqueous electrolyte secondary battery with the average operating voltage of 4 V or greater can be obtained. In particular, when $LiNi_{0.5}Mn_{1.5}O_4$ is used, the average operating voltage can be approximately 4.5 V.

There has been technology in the lithium transition metal composite oxide having a spinel structure, for substituting a part of manganese with nickel, other elements, or nickel and other elements according to the purpose.

JP 2003-197194A discloses a technology that substitutes a part of manganese in a lithium-manganese composite oxide having a spinel structure with nickel or the like and/or with titanium or the like to enhance energy density of a secondary battery.

WO2012/077472 discloses a technology that substitutes a part of manganese in a lithium-manganese composite oxide having a spinel structure with nickel and chromium and with magnesium or the like to improve cycle characteristics of a secondary battery.

JP 2012-033279A discloses a technology that uses, as a positive electrode, a lithium-nickel-manganese oxide having a particular range of specific surface area to prevent decrease in capacity of a secondary battery, which uses a lithium-titanium oxide as a negative electrode, during fast charging.

As an example of the lithium-nickel-manganese oxide, $LiNi_{0.4}Cr_{0.05}Al_{0.05}Mn_{1.4}Ti_{0.1}O_4$ has been disclosed.

SUMMARY OF THE INVENTION

A positive electrode active material for a nonaqueous electrolyte secondary battery including:

a lithium transition metal composite oxide represented by general formula.

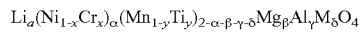

$$Li_a(Ni_{1-x}Cr_x)_\alpha(Mn_{1-y}Ti_y)_{2-\alpha-\beta-\gamma-\delta}Mg_\beta Al_\gamma M_\delta O_4$$

In the formula, the variables "a", "x", "y", "α", "β", "γ", and "δ" satisfy $1.00 \leq a \leq 1.30$, $0.020 \leq x \leq 0.200$, $0.006 \leq y \leq 0.070$, $0.450 \leq \alpha \leq 0.550$, $0 \leq \beta \leq 0.015$, $0 \leq \gamma \leq 0.035$, and $0 \leq \delta \leq 0.010$; and M represents at least one element selected from the group consisting of Na, K, Ca, Sr, Ba, Ga, Co, Zn, Si, Ge, Zr, Hf, Sn, Ta, Nb, P, Bi, Mo, and W.

The positive electrode active material using a lithium-nickel-manganese composite oxide having a spinel structure has high lithium ion conductivity and high electron conductivity and is capable of enhancing output characteristics.

DETAILED DESCRIPTION OF THE INVENTION

Figure 1:
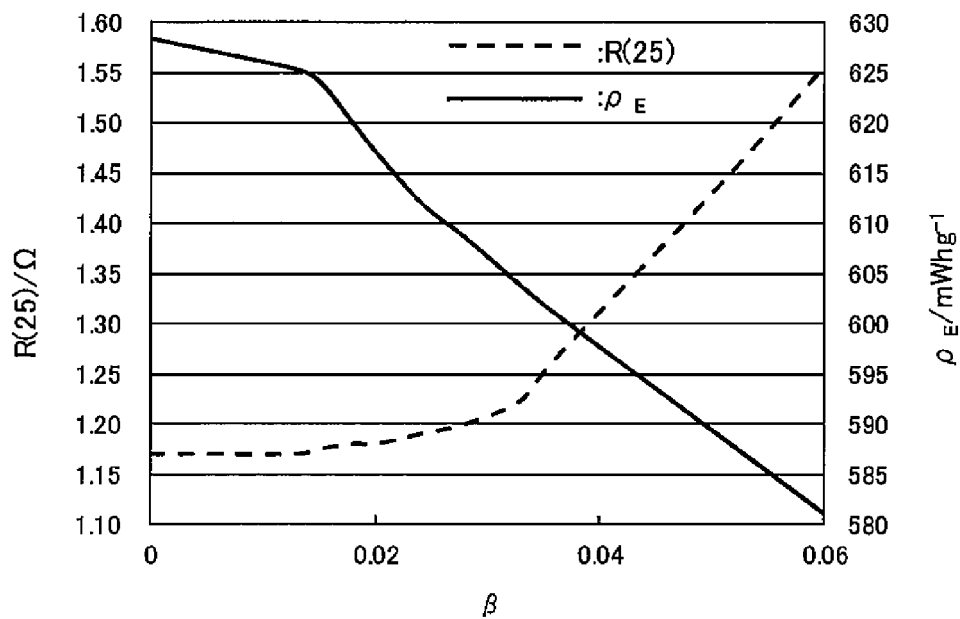
FIG. 1 is a graph illustrating the relationship between an amount of magnesium contained in the lithium-nickel-manganese composite oxide having a spinel structure and characteristics of nonaqueous electrolyte secondary battery using the lithium-nickel-manganese composite oxide having a spinel structure as a positive electrode active material.

The power source for large machinery such as electric vehicles is required to satisfy high energy density and high output characteristics at the same time. The lithium transition metal composite oxides having a spinel structure have high average operating voltage, so that secondary batteries with high energy density can be realized. Meanwhile, the lithium transition metal composite oxides having a spinel structure have relatively low lithium ion conductivity and electron conductivity, which tend to result in insufficient output characteristics. This tendency is more significant in a lithium-nickel-manganese composite oxide having a spinel structure.

Under these circumstances, the embodiment of the present invention has been completed. An object of the embodiment of the present invention is to provide a positive electrode active material for nonaqueous electrolyte secondary batteries that uses a lithium-nickel-manganese composite oxide having a spinel structure, the positive electrode active material exhibiting high lithium ion conductivity and electron conductivity and being capable of enhancing output characteristics.

The present inventors have conducted diligent research to achieve the above object and thus completed the embodiment of the present invention. The present inventors have found that the lithium ion conductivity and the electron conductivity of a lithium-nickel-manganese composite oxide having a spinel structure can be enhanced by allowing chromium and titanium to be contained in the lithium-nickel-manganese composite oxide having a spinel structure and by limiting the contents of magnesium and aluminum to the specific amounts or less.

In the positive electrode active material for nonaqueous electrolyte secondary batteries of an embodiment of the present invention, the positive electrode active material includes:

a lithium transition metal composite oxide represented by general formula.

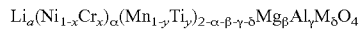

In the formula, the variables "a", "x", "y", "α", "β", "γ", and "δ" satisfy $1.00 \leq a \leq 1.30$, $0.020 \leq x \leq 0.200$, $0.006 \leq y \leq 0.070$, $0.450 \leq \alpha \leq 0.550$, $0 \leq \beta \leq 0.015$, $0 \leq \gamma \leq 0.035$, and $0 \leq \delta \leq 0.010$, and M represents at least one element selected from the group consisting of Na, K, Ca, Sr, Ba, Ga, Co, Zn, Si, Ge, Zr, Hf, Sn, Ta, Nb, P, Bi, Mo, and W.

According to the present embodiment, a positive electrode active material using a lithium-nickel-manganese composite oxide having a spinel structure that has high lithium ion conductivity and high electron conductivity and that is capable of enhancing output characteristics is provided. Also, a nonaqueous electrolyte secondary battery that uses the positive electrode active material for nonaqueous electrolyte secondary batteries according to the present embodiment has high average operating voltage and high output characteristics. Therefore, the nonaqueous electrolyte secondary battery that uses the positive electrode active material for nonaqueous electrolyte secondary batteries according to the present embodiment can exhibit both high energy density and high output characteristics.

The positive electrode active material for nonaqueous electrolyte secondary batteries of the present embodiment will be described referring to an embodiment and examples. However, the present embodiment is not limited by these embodiment and examples.

Positive Electrode Active Material for Nonaqueous Electrolyte Secondary Battery

The positive electrode active material for nonaqueous electrolyte secondary batteries of the present embodiment contains chromium, titanium, and, as a main component, a lithium-nickel-manganese composite oxide having a spinel structure in which the contents of magnesium and aluminum are limited to the specific amounts or less. Hereinafter, "positive electrode active material for nonaqueous electrolyte secondary batteries" is also simply referred to as "positive electrode active material". Furthermore, "lithium-nickel-manganese composite oxide having a spinel structure" is also simply referred to as "lithium transition metal composite oxide". In the positive electrode active material, the content of the lithium transition metal composite oxide is greater than 50% by mass. The content of the lithium transition metal composite oxide is preferably 60% by mass or greater, and more preferably 80% by mass or greater. The lithium transition metal composite oxide will be described below.

Lithium Transition Metal Composite Oxide

The composition of the lithium transition metal composite oxide is represented by general formula:

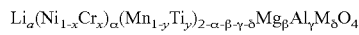

In the formula, the variables "a", "x", "y", "α", "β", "δ", and "δ" satisfy $1.00 \leq a \leq 1.30$, $0.020 \leq x \leq 0.200$, $0.006 \leq y \leq 0.070$, $0.450 \leq \alpha \leq 0.550$, $0 \leq \beta \leq 0.015$, $0 \leq \gamma \leq 0.035$, and $0 \leq \delta \leq 0.010$, and M represents at least one element selected from the group consisting of Na, K, Ca, Sr, Ba, Ga, Co, Zn, Si, Ge, Zr, Hf, Sn, Ta, Nb, P, Bi, Mo, and W.

In the general formula, the variable "a" satisfies $1.00 \leq a \leq 1.30$. When the variable "a" is less than 1.00, the output characteristics of the nonaqueous electrolyte secondary battery is not enhanced. When the variable "a" exceeds 1.30, synthesis of the lithium transition metal composite oxide tends to be difficult. The variable "a" preferably satisfies $1.10 \leq a \leq 1.20$.

The variable "α" in the general formula adjusts the ratio of the amount of substance at the nickel site, which is the site occupied by nickel atoms and chromium atoms, to the amount of substance at the manganese site, which is the site occupied by manganese atoms and titanium atoms, to be close to 1:3. That is, the variable "α" satisfies $0.450 \leq \alpha \leq 0.550$. When the variable "α" satisfies the range described above, the average operating voltage of the nonaqueous electrolyte secondary battery can be adjusted to approximately 4.6 V. The variable "α" preferably satisfies $0.480 \leq \alpha \leq 0.520$.

The variable "β" satisfies $0 \leq \beta \leq 0.015$. FIG. 1 illustrates the relationship between the variable "β" and the energy density $\rho_E$ and the direct-current internal resistance R(25) at 25° C. in a nonaqueous electrolyte secondary battery using the lithium transition metal composite oxide represented by general formula: $Li_{1.11}(Ni_{0.817}Cr_{0.183})_\alpha(Mn_{0.965}Ti_{0.035})_{2-\alpha-\beta}Mg_\beta O_4$. This general formula corresponds to the above-mentioned general formula in which the variables "a", "x", "y", "α", "β", "γ", and "δ" satisfy a=1.11, x=0.183, y=0.035, γ=0, δ=0, and α/(2−α−β−γ−δ)=0.37. Lithium transition metal composite oxides having different values for the variables "a", "x", "y", "α", "γ" and "δ" still show similar trends. As it is clear from FIG. 1, It is clear that the $\rho_E$ rapidly decreases after the variable "β" exceeds approximately 0.015, and R(25) also exceeds 1.20Ω after the variable "β" exceeds approximately 0.030, and thus the output characteristics significantly deteriorate. The smaller variable "β" is more preferable, and β=0 is even more preferable.

Figure 2:
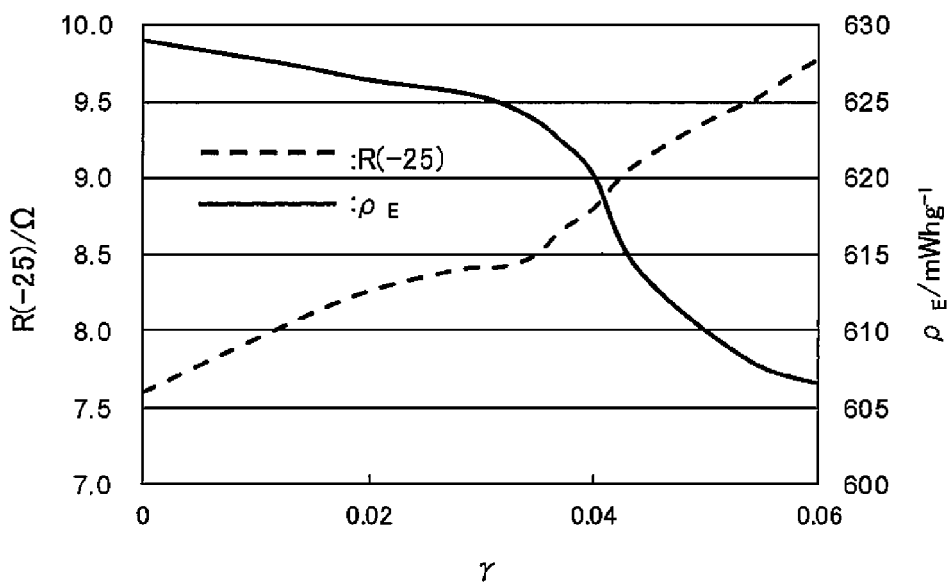
FIG. 2 is a graph illustrating the relationship between an amount of aluminum contained in the lithium-nickel-manganese composite oxide having a spinel structure and characteristics of nonaqueous electrolyte secondary battery using the lithium-nickel-manganese composite oxide having a spinel structure as a positive electrode active material.

The variable "β" satisfies $0 \leq \gamma \leq 0.035$. FIG. 2 illustrates the relationship between the variable "β" and the energy density $\rho_E$ and the direct-current internal resistance R(−25) at −25° C. in a nonaqueous electrolyte secondary battery using the lithium transition metal composite oxide represented by general formula: $Li_{1.10}(Ni_{0.817}Cr_{0.183})_\alpha(Mn_{0.965}Ti_{0.035})_{2-\alpha-\gamma}Al_\gamma O_4$. This general formula corresponds to the above-mentioned general formula in which the variables "a", "x", "y", "α", "β", "γ", and "δ" satisfy a=1.10, x=0.183, y=0.035, β=0, δ=0, and α/(2−α−β−γ−δ)=0.37. Lithium transition metal composite oxides having different values for the variables "a", "x", "y", "α", "β" and "δ" still show similar trends. As it is clear from FIG. 2, it is clear from FIG. 2 that the $\rho_E$ rapidly decreases after the variable "γ" exceeds approximately 0.040, and R(−25) also exceeds 8.5Ω after the variable "γ" exceeds approximately 0.035, and thus the output characteristics significantly deteriorate. The smaller variable "γ" is more preferable, and the variable "γ" even more preferably satisfies $0 \leq \gamma \leq 0.010$, and γ=0 is particularly preferable. Furthermore, the variables "γ" and "δ" preferably satisfy $0 \leq \gamma + \delta \leq 0.010$.

The variable "x" satisfies $0.020 \leq x \leq 0.200$. Furthermore, the variable "y" satisfies $0.006 \leq y \leq 0.070$. When the variable "x" and the variable "y" each satisfy the ranges described above, oxidation-reduction reaction is facilitated at the nickel site, and as a result, the output characteristics of the nonaqueous electrolyte secondary battery are enhanced.

When the variable "x" exceeds 0.200 or when the variable "y" exceeds 0.070, charge-discharge capacity of the nonaqueous electrolyte secondary battery decreases. Furthermore, the average operating voltage of the nonaqueous electrolyte secondary battery may decrease. The variable "x" preferably satisfies $0.050 \leq x \leq 0.150$. Furthermore, the variable "y" preferably satisfies $0.015 \leq y \leq 0.045$.

Furthermore, the ratio of the amount of substance of chromium atoms at the nickel site to the amount of substance of titanium atoms at the manganese site is preferably adjusted to be close to 1:1 since such a ratio results in enhancing mass energy density of the nonaqueous electrolyte secondary battery. That is, the variables "α", "β", "γ", "δ", "x" and "y" preferably satisfy $0.85 \leq (x \cdot \alpha)/\{y \cdot (2-\alpha-\beta-\gamma-\epsilon)\} \leq 1.15$.

Element M

The lithium transition metal composite oxide may contain another element M depending on the purpose. Examples of the element M include Na, K, Ca, Sr, Ba, Ga, Co, Zn, Si, Ge, Zr, Hf, Sn, Ta, Nb, P, Bi, Mo, and W. The element M may be one element or may be two or more elements. The element M is preferably Zr. The variable "δ" satisfies $0 \leq \delta \leq 0.010$. When the variable "δ" exceeds 0.010, output characteristics or average operating voltage may decrease.

Optional Component

In the positive electrode active material, other than the lithium transition metal composite oxide, unavoidable impurities included during the production steps or a minute quantity of additives or the like added in accordance with the purpose may be present.

Method of Producing Positive Electrode Active Material

As the method of producing a positive electrode active material, a publicly known method of producing a positive electrode active material can be appropriately used. For example, the positive electrode active material can be obtained by a method including a step of appropriately preparing a raw material mixture by mixing raw material compounds which are to be decomposed into an oxide at a high temperature according to an objective composition, or by generating a precursor precipitate by dissolving a solvent-soluble raw material compound in a solvent, adjusting the temperature or pH, adding a complexing agent, or the like, and a step of calcining the resulting raw material mixture at an appropriate temperature. Hereinafter, the step of preparing the raw material mixture is referred to as "mixing step", and the step of calcining is referred to as "calcining step".

Mixing Step

The mixing step is a step of obtaining a raw material mixture by mixing raw material compounds which are to be decomposed into an oxide at a high temperature according to an objective composition, or a step of obtaining a raw material mixture by generating a precursor precipitate by dissolving a solvent-soluble raw material compound in a solvent, adjusting the temperature or pH, adding a complexing agent, or the like. Through the mixing step, a raw material component of the positive electrode active material of the present embodiment can be obtained.

The raw material compounds are not particularly limited as long as they are compounds that are decomposed to produce oxides at a high temperature. Examples of the raw material compounds include lithium compounds, nickel compounds, manganese compounds, chromium compounds, and titanium compounds, and oxides, carbonates, hydroxides, nitrates, or sulfates of these, or the like can be also used.

The mixing ratio of the raw material compounds is not particularly limited; however, a mixing ratio which can satisfy the content of each element in the general formula described above is preferable.

Calcining Step

The calcining step is a step of obtaining a calcined material by calcining the raw material mixture. Also, through the calcining step, a calcined material which is the positive electrode active material of the present embodiment can be obtained.

The calcination time varies depending on the calcination temperature; however, typically, the calcination time of 5 hours or longer is sufficient. Longer calcination time is not specifically disadvantageous, but typically, the calcination time of 48 hours is sufficient.

The atmosphere of the calcining is not particularly limited; however, an oxidizing atmosphere is preferable. Examples of the oxidizing atmosphere include an air atmosphere, an oxygen-containing atmosphere, and the like.

EXAMPLE

Hereinafter, the present embodiment will be described more specifically using examples. However, the present embodiment is not limited to these examples. Note that, in the case where a ratio of elements is shown, it is presented as an amount of substance ratio (molar ratio).

Example 1

A composite oxide of Ni:Mn=23.7:76.3 was obtained by using a coprecipitation method. This composite oxide, lithium carbonate, chromium(III) oxide, and titanium(IV) oxide were mixed so that Li:(Ni+Mn):Cr:Ti was 1.10:1.900:0.050:0.050 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.450}Cr_{0.050}Mn_{1.450}Ti_{0.050}O_4$.

Comparative Example 1

A lithium transition metal composite oxide represented by general formula: $Li_{1.10}Ni_{0.500}Mn_{1.500}O_4$ was obtained in a similar manner as in Example 1, except for using a composite oxide of Ni:Mn=25.0:75.0 and mixing no chromium (III) oxide and no titanium(IV) oxide into the mixed raw material.

Comparative Example 2

A lithium transition metal composite oxide represented by general formula: $Li_{1.10}Ni_{0.450}Cr_{0.050}Mn_{1.500}O_4$ was obtained in a similar manner as in Example 1, except for using a composite oxide of Ni:Mn=23.1:76.9 and mixing no titanium(IV) oxide into the mixed raw material.

Comparative Example 3

A lithium transition metal composite oxide represented by general formula: $Li_{1.10}Ni_{0.500}Mn_{1.450}Ti_{0.050}O_4$ was obtained in a similar manner as in Example 1, except for using a composite oxide of Ni:Mn=25.6:74.4 and mixing no chromium(III) oxide into the mixed raw material.

Example 2

A composite oxide of Ni:Mn=23.7:76.3 was obtained by using a coprecipitation method. This composite oxide, lithium carbonate, chromium(III) oxide, and titanium(IV) oxide were mixed so that Li:(Ni+Mn):Cr:Ti was 1.09:1.850:0.099:0.050 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.09}Ni_{0.439}Cr_{0.099}Mn_{1.411}Ti_{0.050}O_4$.

Example 3

A composite oxide of Ni:Mn=23.8:76.2 was obtained by using a coprecipitation method. This composite oxide, lithium carbonate, chromium(III) oxide, titanium(IV) oxide, and magnesium carbonate were mixed so that Li:(Ni+Mn):Cr:Ti:Mg was 1.12:1.838:0.097:0.050:0.015 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.12}Ni_{0.438}Cr_{0.097}Mn_{1.400}Ti_{0.050}Mg_{0.015}O_4$.

Comparative Example 4

A composite oxide of Ni:Mn=23.7:76.3 was obtained by using a coprecipitation method. This composite oxide, lithium carbonate, chromium(III) oxide, titanium(IV) oxide, and magnesium carbonate were mixed so that Li:(Ni+Mn):Cr:Ti:Mg was 1.10:1.832:0.098:0.050:0.020 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.435}Cr_{0.098}Mn_{1.397}Ti_{0.050}Mg_{0.020}O_4$.

Comparative Example 5

A composite oxide of Ni:Mn=23.7:76.3 was obtained by using a coprecipitation method. This composite oxide, lithium carbonate, chromium(III) oxide, titanium(IV) oxide, and magnesium carbonate were mixed so that Li:(Ni+Mn):Cr:Ti:Mg was 1.10:1.828:0.098:0.050:0.024 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.434}Cr_{0.098}Mn_{1.394}Ti_{0.050}Mg_{0.024}O_4$.

Comparative Example 6

A composite oxide of Ni:Mn=23.9:76.1 was obtained by using a coprecipitation method. This composite oxide, lithium carbonate, chromium(III) oxide, titanium(IV) oxide, and magnesium carbonate were mixed so that Li:(Ni+Mn):Cr:Ti:Mg was 1.11:1.815:0.098:0.051:0.036 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.11}Ni_{0.434}Cr_{0.098}Mn_{1.381}Ti_{0.051}Mg_{0.036}O_4$.

Example 4

A composite oxide of Ni:Mn=23.6:76.4 was obtained by using a coprecipitation method. This composite oxide, lithium carbonate, chromium(III) oxide, titanium(IV) oxide, and aluminum oxide were mixed so that Li:(Ni+Mn):Cr:Ti:Al was 1.10:1.833:0.097:0.050:0.020 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.433}Cr_{0.097}Mn_{1.400}Ti_{0.050}Al_{0.020}O_4$.

Example 5

A composite oxide of Ni:Mn=23.7:76.3 was obtained by using a coprecipitation method. This composite oxide, lithium carbonate, chromium(III) oxide, titanium(IV) oxide, and aluminum oxide were mixed so that Li:(Ni+Mn):Cr:Ti:Al was 1.10:1.825:0.097:0.050:0.028 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.433}Cr_{0.097}Mn_{1.392}Ti_{0.050}Al_{0.028}O_4$.

Example 6

A composite oxide of Ni:Mn=23.7:76.3 was obtained by using a coprecipitation method. This composite oxide, lithium carbonate, chromium(III) oxide, titanium(IV) oxide, and aluminum oxide were mixed so that Li:(Ni+Mn):Cr:Ti:Al was 1.10:1.821:0.097:0.050:0.032 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.432}Cr_{0.097}Mn_{1.389}Ti_{0.050}Al_{0.032}O_4$.

Comparative Example 7

A composite oxide of Ni:Mn=23.7:76.3 was obtained by using a coprecipitation method. This composite oxide, lithium carbonate, chromium(III) oxide, titanium(IV) oxide, and aluminum oxide were mixed so that Li:(Ni+Mn):Cr:Ti:Al was 1.10:1.817:0.097:0.049:0.037 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.431}Cr_{0.097}Mn_{1.386}Ti_{0.049}Al_{0.037}O_4$.

Comparative Example 8

A composite oxide of Ni:Mn=23.7:76.3 was obtained by using a coprecipitation method. This composite oxide, lithium carbonate, chromium(III) oxide, titanium(IV) oxide, and aluminum oxide were mixed so that Li:(Ni+Mn):Cr:Ti:Al was 1.10:1.810:0.097:0.049:0.044 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.429}Cr_{0.097}Mn_{1.381}Ti_{0.049}Al_{0.044}O_4$.

Comparative Example 9

A composite oxide of Ni:Mn=23.7:76.3 was obtained by using a coprecipitation method. This composite oxide, lithium carbonate, chromium(III) oxide, titanium(IV) oxide, and aluminum oxide were mixed so that Li:(Ni+Mn):Cr:Ti:Al was 1.10:1.789:0.096:0.049:0.066 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.424}Cr_{0.096}Mn_{1.365}Ti_{0.049}Al_{0.066}O_4$.

Example 7

A composite oxide of Ni:Mn=23.7:76.3 was obtained by using a coprecipitation method. This composite oxide, lithium carbonate, chromium(III) oxide, titanium(IV) oxide, and zirconium oxide were mixed so that Li:(Ni+Mn):Cr:Ti:Zr was 1.10:1.894:0.050:0.050:0.006 to obtain a mixed raw material. The obtained mixed raw material was calcined in an air atmosphere at 900° C. for 11 hours to obtain a calcined material. The obtained calcined material was ground and then dry-sieved to obtain a lithium transition metal composite oxide represented by general formula: $Li_{1.10}Ni_{0.449}Cr_{0.050}Mn_{1.445}Ti_{0.050}Zr_{0.006}O_4$.

Output Characteristics Evaluation

The internal resistance of the nonaqueous electrolyte secondary batteries which respectively employ each of the lithium transition metal composite oxides obtained in Examples 1 to 7 and Comparative Examples 1 to 9 as a positive electrode active material was determined. Lower internal resistance indicates better output characteristics.

1. Forming Positive Electrode

A positive electrode paste was obtained by kneading 90% by mass of positive electrode active material, 5% by mass of carbon powder, and 5% by mass of N-methyl pyrrolidone (NMP) solution of polyvinylidene fluoride (PVDF) (5% by mass in terms of PVDF). The obtained positive electrode paste was applied on a current collector made of aluminum foil, then dried and rolled to obtain a positive electrode.

2. Forming Negative Electrode

Lithium titanate was used as a negative electrode active material. A negative electrode paste was obtained by dispersing 97.5% by mass of negative electrode active material, 1.5% by mass of carboxymethyl cellulose (CMC), and 1.0% by mass of styrene-butadiene rubber (SBR) in pure water and kneading. The obtained negative electrode paste was applied on a current collector made of copper foil, then dried and rolled to obtain a negative electrode.

3. Forming Nonaqueous Electrolytic Solution

A mixed solvent was prepared by mixing ethylene carbonate (EC) and methylethyl carbonate (MEC) at a volume ratio of 3:7. Lithium hexafluorophosphate ($LiPF_6$) was dissolved in the obtained mixed solvent so that the concentration thereof became 1 mol/L to obtain a nonaqueous electrolytic solution.

4. Separator

A porous polyethylene film was used as a separator.

5. Production of Secondary Battery

A lead electrode was attached to each current collector of the positive and negative electrodes, followed by vacuum drying at 120° C. After drying, a separator was arranged in between the positive electrode and the negative electrode, and these members were placed in a bag-shape laminate pack. Thereafter, moisture adsorbed to each member was removed by vacuum drying at 60° C. After drying, the nonaqueous electrolytic solution was injected into the laminate pack, and then the laminate pack was sealed to obtain a nonaqueous electrolyte secondary battery for evaluation. The obtained secondary battery was aged with a micro current thereby allowing the electrolyte to permeate sufficiently into the positive and negative electrodes. After aging, the secondary battery was placed in an environment at 25° C. and an environment at −25° C., and the direct-current internal resistance was measured.

6. Direct-Current Internal Resistance Measurement

A constant current charging at a full charge voltage of 3.5 V was conducted to 50% of charging depth. After charging, a pulse discharge was conducted at a specific current i and the voltage V was measured. The pulse was supplied at a duration of 10 seconds and an interpulse interval of 3 minutes. The last voltage value of each pulse was read as the voltage V. An approximation straight line was found by plotting the values of the voltage V at i=0.04 A, 0.08 A, 0.12 A, 0.16 A, and 0.20 A by plotting the current i on the horizontal axis and the voltage V on the vertical axis. Then, the internal resistance R(T) at T° C. was determined from an absolute value of the slope of the approximation straight line of the plot.

Energy Density Evaluation

The energy density of the secondary batteries which respectively employ each of the lithium transition metal composite oxides obtained in Examples 1 to 7 and Comparative Examples 1 to 9 as the positive electrode active material was evaluated as described below.

1. Forming Positive Electrode

A positive electrode was obtained by a similar manner as in the secondary batteries fabricated for the output characteristics evaluation.

2. Forming Negative Electrode

A negative electrode was obtained by forming metallic lithium into a thin sheet-like shape.

3. Forming Nonaqueous Electrolytic Solution

An electrolytic solution was obtained by a similar manner as in the secondary batteries fabricated for the output characteristics evaluation, except for using diethyl carbonate in place of MEC.

4. Separator

A separator similar to that used in the secondary battery for output characteristics evaluation was used.

5. Production of Secondary Battery

A lead electrode was attached to the positive electrode, and the positive electrode, the separator, and the negative electrode were placed, in this order, in a housing. The negative electrode was electrically connected to the bottom of the housing made of stainless steel, so that the bottom portion of the housing served as the negative terminal. The separator was fixed by a side portion of the housing made of Teflon (registered trademark). An end portion of the lead electrode at the positive electrode was led out of the housing to serve as a positive terminal. The positive and negative terminals were electrically insulated by the side portions of the housing. After the placement, the electrolytic solution was injected and the housing was sealed with a container lid member, made of stainless steel, to obtain a sealed battery for evaluation. The obtained battery was used in the evaluation of energy density.

6. Discharge Capacity Measurement

Constant current-constant voltage charging was carried out at a full charge voltage of 5.0 V and a charging rate of 0.1 C. Then, constant current discharging at a discharging voltage of 3.0 V and a discharging rate of 0.1 C was carried out. The amount of charge per unit mass released from the start of discharge to completion of discharge was determined as discharge capacity $Q_d$. Here, 1C means a current density required to complete discharge within 1 hour from a fully charged state.

7. Average Operating Voltage Calculation

Time average of operating voltage of secondary battery during discharging was calculated and represented as average operating voltage $<E>$.

8. Energy Density Calculation

Energy per unit mass $\rho_E$ extracted from the secondary battery was calculated from the product of $Q_d$ and $<E>$ and this was represented as the energy density of the secondary battery.

With regard to Examples 1 to 8 and Comparative Examples 1 to 10, composition of main component of the respective positive electrode active materials and characteristics of the respective batteries are shown in Table 1.

component composition, have deteriorated compared to those of the secondary battery using the positive electrode active material of Comparative Example 1.

The secondary battery using the positive electrode active material of Example 1, in which both chromium and titanium are, contained in the main component composition, has exhibited sufficiently enhanced output characteristics.

With the secondary batteries using the positive electrode active materials of Comparative Examples 4 to 6, in which an excessive amount of magnesium is contained in the main component composition, energy densities $\rho_E$ are less than 620 mWh/g, and thus the energy densities are not satisfactory. The secondary battery using the positive electrode active material of Comparative Example 6 has resulted in $R(25)$ of greater than 1.20Ω, and thus the output characteristics is also not satisfactory. The range of the variable "β" that exhibits sufficient output characteristics and energy density of a secondary battery is approximately β=0.015 or less. Furthermore, smaller variable "β" is better and β=0 is the best.

The secondary batteries using the positive electrode active materials of Comparative Examples 7 to 9, in which an excessive amount of aluminum is contained in the main component composition, have resulted in $R(-25)$ of greater than 8.55, and thus the output characteristics are not satis-

TABLE 1

| | Main component composition | $R(25)/$ Ω | $R(-25)/$ Ω | $Q_d/$ mAhg$^{-1}$ | $<E>/$ V | $\rho_E/$ mWhg$^{-1}$ |
|---|---|---|---|---|---|---|
| Example 1 | Li$_{1.10}$Ni$_{0.450}$Cr$_{0.050}$Mn$_{1.450}$Ti$_{0.050}$O$_4$ | 1.13 | 7.5 | 137.7 | 4.6 | 637 |
| Comparative Example 1 | Li$_{1.10}$Ni$_{0.500}$Mn$_{1.500}$O$_4$ | 1.52 | 10.5 | 136.5 | 4.7 | 637 |
| Comparative Example 2 | Li$_{1.10}$Ni$_{0.450}$Cr$_{0.050}$Mn$_{1.500}$O$_4$ | 1.35 | 8.4 | 138.6 | 4.6 | 640 |
| Comparative Example 3 | Li$_{1.10}$Ni$_{0.500}$Mn$_{1.450}$Ti$_{0.050}$O$_4$ | 1.60 | 13.1 | 136.6 | 4.7 | 638 |
| Example 2 | Li$_{1.09}$Ni$_{0.439}$Cr$_{0.099}$Mn$_{1.411}$Ti$_{0.050}$O$_4$ | 1.17 | 7.6 | 136.4 | 4.6 | 630 |
| Example 3 | Li$_{1.12}$Ni$_{0.438}$Cr$_{0.097}$Mn$_{1.400}$Ti$_{0.050}$Mg$_{0.015}$O$_4$ | 1.18 | 8.1 | 135.2 | 4.6 | 622 |
| Comparative Example 4 | Li$_{1.10}$Ni$_{0.435}$Cr$_{0.098}$Mn$_{1.397}$Ti$_{0.050}$Mg$_{0.020}$O$_4$ | 1.18 | 8.1 | 134.4 | 4.6 | 618 |
| Comparative Example 5 | Li$_{1.10}$Ni$_{0.434}$Cr$_{0.098}$Mn$_{1.394}$Ti$_{0.050}$Mg$_{0.024}$O$_4$ | 1.20 | 8.3 | 133.6 | 4.6 | 613 |
| Comparative Example 6 | Li$_{1.11}$Ni$_{0.434}$Cr$_{0.098}$Mn$_{1.381}$Ti$_{0.051}$Mg$_{0.036}$O$_4$ | 1.27 | 8.0 | 131.5 | 4.6 | 601 |
| Example 4 | Li$_{1.10}$Ni$_{0.433}$Cr$_{0.097}$Mn$_{1.400}$Ti$_{0.050}$Al$_{0.020}$O$_4$ | 1.16 | 8.4 | 135.5 | 4.6 | 626 |
| Example 5 | Li$_{1.10}$Ni$_{0.433}$Cr$_{0.097}$Mn$_{1.392}$Ti$_{0.050}$Al$_{0.028}$O$_4$ | 1.18 | 8.4 | 135.5 | 4.6 | 626 |
| Example 6 | Li$_{1.10}$Ni$_{0.432}$Cr$_{0.097}$Mn$_{1.389}$Ti$_{0.050}$Al$_{0.032}$O$_4$ | 1.18 | 8.5 | 135.0 | 4.6 | 624 |
| Comparative Example 7 | Li$_{1.10}$Ni$_{0.431}$Cr$_{0.097}$Mn$_{1.386}$Ti$_{0.049}$Al$_{0.037}$O$_4$ | 1.20 | 8.7 | 134.6 | 4.6 | 622 |
| Comparative Example 8 | Li$_{1.10}$Ni$_{0.429}$Cr$_{0.097}$Mn$_{1.381}$Ti$_{0.049}$Al$_{0.044}$O$_4$ | 1.21 | 9.2 | 133.0 | 4.6 | 614 |
| Comparative Example 9 | Li$_{1.10}$Ni$_{0.424}$Cr$_{0.096}$Mn$_{1.385}$Ti$_{0.049}$Al$_{0.066}$O$_4$ | 1.25 | 9.7 | 130.7 | 4.6 | 604 |
| Example 7 | Li$_{1.10}$Ni$_{0.449}$Cr$_{0.050}$Mn$_{1.445}$Ti$_{0.050}$Zr$_{0.006}$O$_4$ | 1.18 | 8.5 | 137.1 | 4.6 | 633 |

Table 1 clearly showed the following.

The secondary battery using the positive electrode active material of Comparative Example 2, in which only chromium is contained in the main component composition, has improved the output characteristics compared to those of the secondary battery using the positive electrode active material of Comparative Example 1, in which no chromium is contained in the main component composition; however, since $R(25)$ has exceeded 1.20 the output characteristics of the secondary battery using the positive electrode active material of Comparative Example 2 are still not satisfactory.

The output characteristics of the secondary battery using the positive electrode active material of Comparative Example 3, in which only titanium is contained in the main factory. The secondary batteries using the positive electrode active materials of Comparative examples 8 and 9 have resulted in $\rho_E$ of less than 620 mWh/g, and the energy densities are not satisfactory. The range of the variable "γ" that exhibits sufficient output characteristics and energy density of a secondary battery is approximately γ=0.035 or less. Furthermore, smaller variable "γ" is better and γ=0 is the best.

By using the positive electrode active material for nonaqueous electrolyte secondary batteries of the present embodiment, a nonaqueous electrolyte secondary battery having both high energy density and high output characteristics can be obtained.

The obtained nonaqueous electrolyte secondary battery can be suitably used as the power source for large machinery such as electric vehicles.

As described above, it should be obvious that various other embodiments are possible without departing the spirit and scope of the present invention. Accordingly, the scope and spirit of the present invention should be limited only by the following claims. All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for a nonaqueous electrolyte secondary battery comprising:

a lithium transition metal composite oxide represented by general formula:

$$Li_a(Ni_{1-x}Cr_x)_\alpha(Mn_{1-y}Ti_y)_{2-\alpha-\beta-\gamma-\delta}Mg_\beta Al_\gamma M_\delta O_4,$$

wherein $1.00 \le a \le 1.30$, $0.020 \le x \le 0.200$, $0.006 \le y \le 0.070$, $0.450 \le \alpha \le 0.550$, $0 \le \beta \le 0.015$, $0 \le \gamma \le 0.035$, and $0 \le \delta \le 0.010$; and M represents at least one element selected from the group consisting of Na, K, Ca, Sr, Ba, Ga, Co, Zn, Si, Ge, Zr, Hf, Sn, Ta, Nb, P, Bi, Mo, and W.

2. The positive electrode active material according to claim 1, wherein, in the general formula, $\beta$ satisfies $\beta=0$.

3. The positive electrode active material according to claim 2, wherein, in the general formula, $\gamma$ satisfies $\gamma=0$.

4. The positive electrode active material according to claim 3, wherein, in the general formula, M is Zr.

5. The positive electrode active material according to claim 2, wherein, in the general formula, M is Zr.

6. The positive electrode active material according to claim 1, wherein, in the general formula, $\gamma$ satisfies $\gamma=0$.

7. The positive electrode active material according to claim 6, wherein, in the general formula, M is Zr.

8. The positive electrode active material according to claim 1, wherein, in the general formula, M is Zr.

9. The positive electrode active material according to claim 1, wherein, in the general formula, y satisfies $0.015 \le y \le 0.045$.

10. The positive electrode active material according to claim 1, wherein, in the general formula, x satisfies $0.050 \le x \le 0.150$.

11. A positive electrode active material for a nonaqueous electrolyte secondary battery comprising:

a lithium transition metal composite oxide represented by general formula:

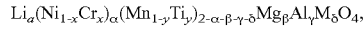

wherein $1.00 \le a \le 1.30$, $0.020 \le x \le 0.200$, $0.006 \le y \le 0.070$, $0.450 \le \alpha \le 0.550$, $0 \le \beta \le 0.015$, $0 \le \gamma \le 0.035$, and $0 \le \delta \le 0.010$; and M represents at least one element selected from the group consisting of Na, K, Ca, Sr, Ba, Ga, Co, Zn, Si, Ge, Zr, Hf, Sn, Ta, Nb, P, Bi, Mo, and W, and wherein, in the general formula, x, y, $\alpha$, $\beta$, $\gamma$, and $\delta$ satisfy $0.85 \le (x \sim \alpha)/\{y \cdot (2-\alpha-\beta-\gamma-\delta)\} \le 1.15$.

12. The positive electrode active material according to claim 11, wherein, in the general formula, $\beta$ satisfies $\beta=0$.

13. The positive electrode active material according to claim 12, wherein, in the general formula, $\gamma$ satisfies $\gamma=0$.

14. The positive electrode active material according to claim 13, wherein, in the general formula, M is Zr.

15. The positive electrode active material according to claim 12, wherein, in the general formula, M is Zr.

16. The positive electrode active material according to claim 11, wherein, in the general formula, $\gamma$ satisfies $\gamma=0$.

17. The positive electrode active material according to claim 16, wherein, in the general formula, M is Zr.

18. The positive electrode active material according to claim 11, wherein, in the general formula, M is Zr.

19. The positive electrode active material according to claim 11, wherein, in the general formula, y satisfies $0.015 \le y \le 0.045$.

20. The positive electrode active material according to claim 11, wherein, in the general formula, x satisfies $0.050 \le x \le 0.150$.

* * * * *